United States Patent [19]

Ouvrard et al.

[11] Patent Number: 5,033,527
[45] Date of Patent: Jul. 23, 1991

[54] MOTORIZED ROLLER BLIND

[75] Inventors: Gaston Ouvrard; Jean-Marie Jeuffray, both of Bressuire, France

[73] Assignee: Ets Farnier & Penin, Bressuire, France

[21] Appl. No.: 509,817

[22] Filed: Apr. 17, 1990

[30] Foreign Application Priority Data

Apr. 19, 1989 [FR] France ............................ 89 05203

[51] Int. Cl.⁵ .............................................. E06B 9/56
[52] U.S. Cl. ...................................... 160/310; 160/68; 160/265
[58] Field of Search .................... 160/310, 265, 68, 72, 160/262, 82, 70; 296/97.4, 97.8

[56] References Cited

U.S. PATENT DOCUMENTS 1,505,386  8/1924  Golding et al. .................. 160/68
3,074,474  1/1963  Dunn .............................. 160/265 X

FOREIGN PATENT DOCUMENTS 562668  7/1944  United Kingdom .................. 160/68
570456  7/1945  United Kingdom ................. 160/265

Primary Examiner—Blair M. Johnson
Attorney, Agent, or Firm—Griffin, Branigan & Butler

[57] ABSTRACT

A motorized roller blind comprises a housing in which at least one roller member is rotatably mounted, and a strip of material forming the blind member which is fixed to the roller member at one end and to a pull bar at the other end. Actuating means comprise first and second links each having a first end pivotally fixed to the pull bar in the vicinity of a respective end thereof, and a second end pivotally fixed to a coupling member which is itself fixed to a respective end of a rack drive member adapted to be displaced by a drive pinion drive by a motor.

5 Claims, 1 Drawing Sheet

U.S. Patent  July 23, 1991  5,033,527
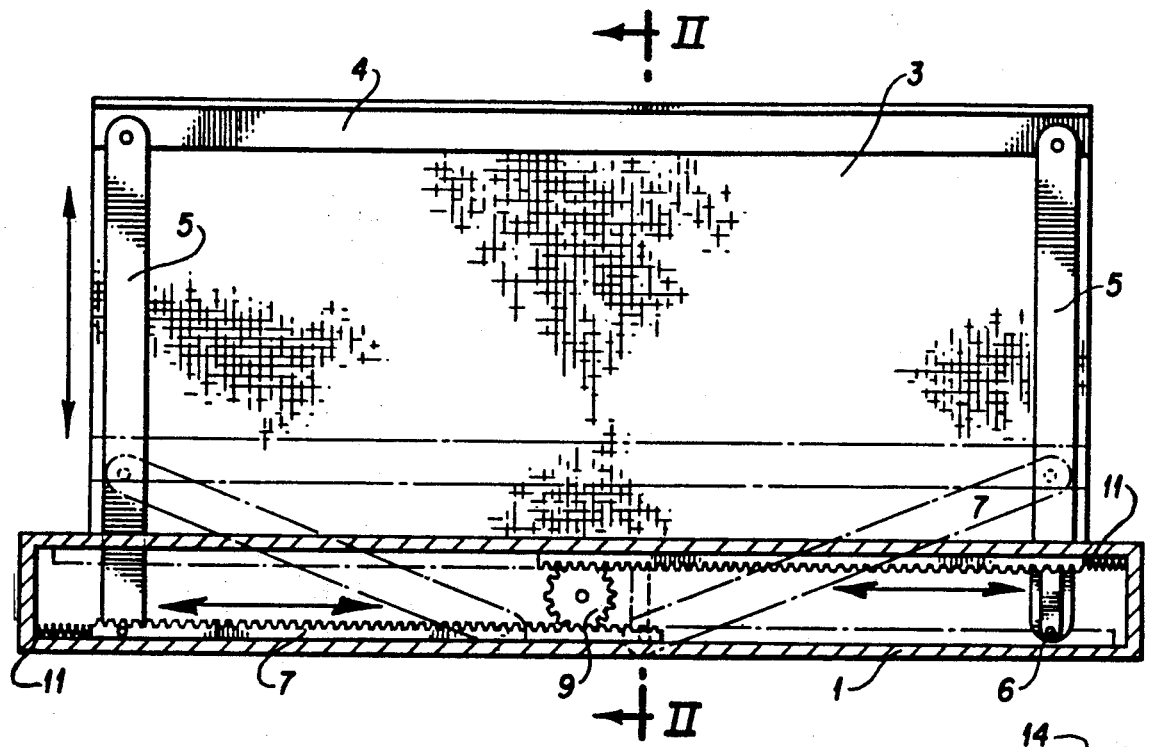
FIG. 1
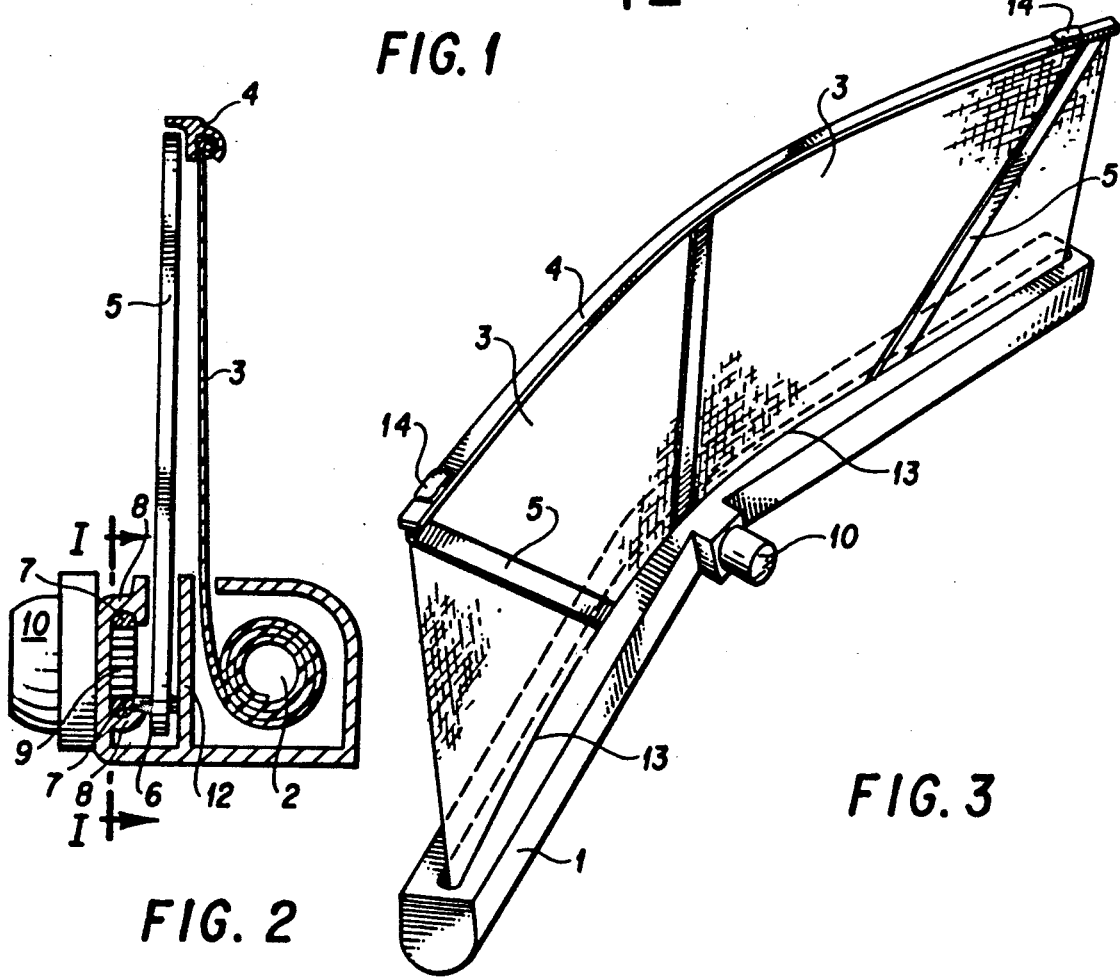
FIG. 2
FIG. 3

MOTORIZED ROLLER BLIND

BACKGROUND OF THE INVENTION

The present invention concerns a motorised roller blind which is intended more particularly but not exclusively to cover an opening, for example a window in a motor vehicle.

There are various forms of motorised roller blinds, for example blinds in which the actuating means thereof are formed by cable rack members which are fixed to the ends of a pull bar for drawing the blind into an extended condition, and which are guided in lateral sliding guides positioned on respective sides of the opening to be covered by the blind when extended. However such arrangements are not easy to dismantle and they cannot therefore be used as a rear window blind for vehicles which have a removable rear window or parcel shelf.

Another form of motorised roller blind comprises a pantograph assembly comprising two struts or links which are mounted in crossed relationship pivotally connected to the pull bar and associated with movable members disposed in the housing of the roller blind and generally driven by an endless worm. Blinds of that nature are self-supporting but the crossed struts or links are visible through the blind itself so that such blinds are generally inelegant and are therefore not suitable for use in high-quality or top-of-the-range vehicles in which the esthetic aspect is often of major importance.

SUMMARY OF THE INVENTION

An object of the present invention is to provide a roller blind which is of an attractive appearance while being operationally effective.

Another object of the present invention is to provide a motorised roller blind which is adequately rigid in an extended position while being easily dismantleable and which can accordingly be operatively associated with a removable rear window or parcel shelf in a motor vehicle.

Another object of the present invention is to provide a motorised roller blind of a simple structure while however affording a high level of operational reliability in terms of extension and retraction thereof and ease of actuation.

In accordance with the invention these and other objects are achieved by a motorised roller blind comprising an elongate housing with at least one roller member rotatably disposed therein. At least one strip of material or fabric forming the actual blind of the arrangement has a first end fixed to the roller member and a second end fixed to a pull bar. The blind structure further includes a position control or actuating means comprising first and second struts or links of a length equal to approximately half the length of the housing, with each strut or link having a first end pivotally connected at a fixed position on the pull bar in the vicinity of one end thereof an a second end pivotally connected at a fixed position to a coupling member fixed to one end of a rack drive member of a length equal to approximately half the length of the housing. The two drive members are disposed on respective sides of and engaged with a drive pinion mounted rotatably in the housing substantially at an equal distance from the ends of the housing, with a motor being operatively connected to the drive pinion to drive same.

As will be seen in greater detail from a preferred embodiment of the blind according to the principles of the present invention, when the drive pinion is driven in rotation, it causes the rack drive members to be displaced with a sliding movement in two opposite directions and the links or struts are displaced symmetrically with respect to a central plane of the housing until the blind member is in a totally extended condition in which the links or struts are substantially parallel to the side edges of the strip of fabric or material forming the blind member.

In accordance with a preferred feature of the invention the drive members are cable racks which are held in engagement with the drive pinion by sliding guides, while in accordance with a further preferred feature the blind comprises travel limiting abutments disposed in the housing facing the ends of the drive members. That arrangement therefore ensures that in the extended condition the blind assembly is of sufficient rigidity to hold the blind member in that position.

In accordance with still another preferred feature of the invention the blind comprises first and second strips of blind material or fabric which are each fixed to a respective roller member, with the two strips being associated with a common curved pull bar. Thus, by arranging the roller members at an angle, the strips of blind material assume a configuration which is close to that of a curved window and the blind can therefore be disposed in closely adjacent relationship to a curved window of that nature.

Further objects, features and advantages of the invention will be apparent from the following description of preferred embodiments.

BRIEF DESCRIPTION OF THE DRAWINGS

FIG. 1 is a diagrammatic elevational view of a first embodiment of the blind according to the present invention partly in section taken along line II—II in FIG. 1, FIG. 2 is a view in section taken along line II—II in FIG. 1, and FIG. 3 is a diagrammatic perspective view of a second embodiment of the invention.

DESCRIPTION OF PREFERRED EMBODIMENT

Referring now generally to the drawings, the roller blind according to the invention comprises an elongate housing 1 in which a cylindrical roller member 2 is rotatably mounted. The roller member 2 is urged in a winding direction by a suitable spring (not shown). A strip 3 of fabric or material for forming the blind member has one of its ends fixed to the roller member 2 and the other opposite end fixed to a pull bar 4.

In accordance with the invention, the blind also comprises position control or actuating means comprising first and second links 5 which are each of a length equal to approximately half the length of the housing 1. Each link 5 has a first end fixed pivotally in the vicinity of one end of the pull bar 4, and a second opposite end pivotally fixed to a coupling member which is indicated at 6 in FIG. 1. The coupling member 6 is itself fixed to a respective end of a rack-type drive member indicated at 7 in FIG. 1.

Referring now more specifically to FIGS. 1 and 2, the drive members 7 are formed by cable racks mounted slidably in sliding guides 8 forming an integral part of the housing 1. The drive members 7 are disposed on respective sides of a drive pinion 9 which is mounted rotatably in the housing 1, substantially at an equal distance from the ends of the housing 1. The drive pinion 9 can be driven in rotation by a motor-reducing unit indicated at 10 in FIG. 2. One of the cable racks 7 is disposed above the pinion 9 while the other cable rack 7 is disposed below the pinion 9, in such a way that, when the pinion 9 is driven in rotation in one direction, the two cable racks 7 are displaced with a translatory movement in mutually opposite directions. That arrangement can be clearly seen from FIG. 1 showing the relationship between the racks 7 and the pinion 9.

So that the lower pivot axes of the links 5 are disposed at the same level and the movements thereof are therefore symmetrical with respect to a plane perpendicular to the strip 3 at the middle thereof, the coupling member 6 associated with the upper cable rack 7 comprises a portion which is displaced downwardly with respect thereto.

Preferably, the blind also comprises travel limiting abutments which are illustrated herein in the form of springs 11 and which are disposed in the housing 1 in opposite relationship to the respective ends of the drive members or racks 7. In order to prevent the links 5 from rubbing against the strip 3 when the blind is moved between its extended and retracted positions, the casing 1 also preferably comprises a separating wall portion indicated at 12 in FIG. 1.

In the retracted position of the blind as shown in phantom dash-dotted lines in FIG. 1, the lower ends of the links 5 are adjacent to the drive pinion 9 and extend in an inclined position. When the drive pinion 9 is driven in rotation to displace the drive members 7 outwardly towards the respective ends of the housing 1, the links 5 progressively move into an upright position, causing the strip 3 of fabric or material to be unwound from the roller 2, until the moment at which the links 5 reach a substantially vertical limit position. The housing 1, links 5 and pull bar 4 then constitute a frame structure supporting the strip 3 in an extended position of the blind.

It will be noted in that respect that the blind according to the invention can be stopped in an intermediate position and, irrespective of the position involved, the links 5 do not at any time take up a position opposite the central part of the strip 3, so that the blind according to the invention can be used not only as a blind for a rear window, for example in a motor vehicle, as illustrated in the drawings, but also as a sunshade arrangement for side windows of a vehicle or in relation to the windshield of a vehicle, in which case the housing 1 is preferably fixed to an upper portion of the structure of the vehicle such as a part of the roof structure, with the bar 4 disposed beneath the housing 1, so that the strip 3 is extended downwardly across the window.

Reference will now be made to FIG. 3 showing another embodiment of the invention in which the housing 1 comprises first and second straight portions forming an angle relative to each other and each containing therein a respective straight roller member associated with a respective strip 3 of fabric or material for forming the blind member, with one of the ends of the strips 3 being connected to a common curved pull bar as indicated at 4.

As in the embodiment described with reference to FIGS. 1 and 2, the position control or actuating means comprise just first and second links 5 which are pivotally connected to an end of the common pull bar 4. In this embodiment the axis of the motor 10 is preferably disposed on the line bisecting the two straight portions of the housing 1 and the sliding guides which are indicated at 8 in FIG. 2 but which are not shown in FIG. 3 are also straight in order to guide the links 5 with a rectilinear movement within the slot 13 through which the blind members or strips pass. A blind of that kind is particularly suitable for use as a blind for a rear window in vehicles having curved rear windows. In order to enhance the rigidity of the assembly in the extended position of the blind, the pull bar 4 preferably comprises abutments as indicated diagrammatically at 14, which come to bear against the inside surface of the roof structure of the vehicle when the blind is in the extended position.

It will be appreciated that the above-described structures have been set forth solely by way of example and illustration of the principles of the present invention and that various modifications and alterations may be made therein without thereby departing from the spirit and scope of the invention. For example in the case of a straight housing, as shown in FIG. 1, the drive members 7 may be formed by rigid rods.

In order to minimise the amount of noise involved and to increase the overall rigidity of the blind, it is also possible to provide rubbing pads or strips with a low coefficient of friction at the location of the openings or slots 13 through which the struts or links 5 pass. It is also possible to provide travel limiting abutments adjacent to the pinion 9 to limit the movement of the links 5 in the direction of retraction movement of the blind.

We claim:

1. A motorised roller blind comprising an elongate housing, at least one roller member in the housing, at least one strip of material having a first end fixed to the roller member and a second end, a pull bar fixed to said second end of said at least one strip, and actuating means comprising first and second links of a length equal to approximately half the length of the housing, each link having a first end pivotally connected at a fixed point to the pull bar in the vicinity of a respective end thereof and a second end, a respective coupling member to which the second end of an associated said link is pivotally connected, a respective rack drive member having an end to which a respective said coupling member is connected, each rack drive member being of a length equal to approximately half the length of the housing, a drive pinion mounted rotatably in the housing substantially at an equal distance from the ends of the housing, with said drive members being disposed on respective sides of and engaging with said drive pinion, and a motor adapted to drive the drive pinion.

2. A blind as set forth in claim 1 wherein said drive members are cable racks and further including sliding guide means operable to hold said cable racks in engagement with said drive pinion.

3. A blind as set forth in claim 1 and further including travel limiting abutments disposed in the housing facing said ends of the respective drive members.

4. A blind as set forth in claim 1 and further including travel limiting abutment means on said pull bar.

5. A blind as set forth in claim 1 comprising first and second said roller members, and first and second said strips which are each fixed to a respective said roller member, and a common curved pull bar associated with said first and second strips.

* * * * *